Oct. 9, 1956  E. M. GOLDBERGER ET AL  2,765,692
DAMPING ATTACHMENT FOR STRING INSTRUMENTS
Filed Oct. 5, 1953
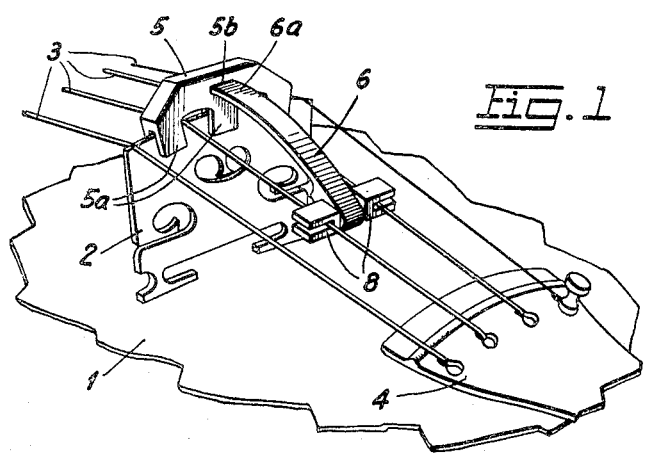
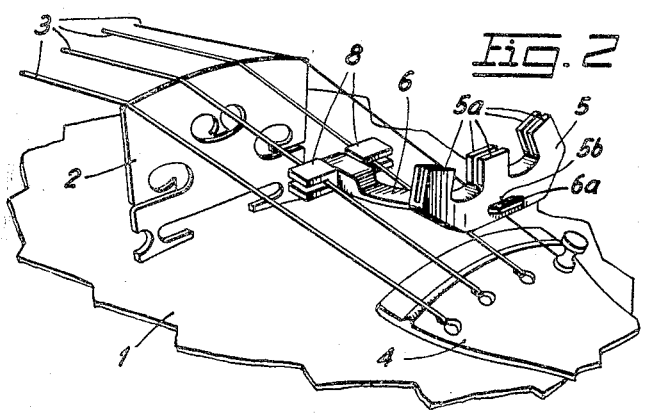
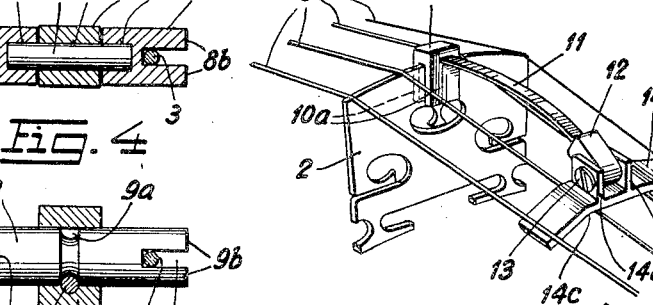

United States Patent Office 2,765,692
Patented Oct. 9, 1956

2,765,692

DAMPING ATTACHMENT FOR STRING INSTRUMENTS

Ernö Meir Goldberger, Givat Rambam, Israel, and Jehudi Menuhin, Los Gatos, Calif.

Application October 5, 1953, Serial No. 384,206

Claims priority, application Switzerland September 7, 1953

8 Claims. (Cl. 84—274)

Our present invention relates to improvements in damping attachments for string instruments, such as violins and violincellos, in which the strings are supported by a bridge, which attachment comprises a damper adapted to be mounted on said bridge.

Known damping attachments, as e. g. the "violin mute," consist merely of a damper which, according to the desired damping effect, comprises one, two or more pairs of prongs. In many pieces of music it happens that the damper has to be alternately put on and removed several times in accordance with the desired sound effect. Many musicians take as a trouble and nuisance the necessity of putting the removed damper down at some place or into a pocket of their clothes and that very often they cannot find the damper immediately when they need the same again. For the soloist, in particular, such searching movements often are awkward and distressing.

Such fault is radically corrected in a very simple manner by the damping attachment according to the present invention, which is characterized by a member adapted to be detachably secured to that portion of a string or strings which extend from the bridge to the tailpiece, and by an arm which carries the damper and is pivoted to said member. Said damper thus may be engaged to and disengaged from the bridge by swinging the arm downwardly and upwardly respectively, without any necessity of removing the damping attachment as a whole from the string instrument.

Several forms of the present invention are shown in the accompanying drawing in which:

Fig. 1 is a perspective view of a first form, in which the damper is in its operative position, i. e. seated on the bridge of a violin, Fig. 2 is a similar view of the same form in which, however, the damper is disengaged from the bridge, Fig. 3 is a cross-section through the rear portion of said first form and shows details of the connection between the swing arm and the clamping elements which are retained by two strings, Fig. 4 is a similar cross-section through a modification of said rear portion, and Fig. 5 is a view similar to Fig. 1 of a further form of the damping attachment.

In Figs. 1 and 2, the top back of a violin body is designated by 1, the bridge secured thereto by 2, the four strings supported by said bridge by 3, and the string retainer or tailpiece by 4.

The damping attachment shown in Figs. 1 and 2 comprises a damper 5 which, as most of the conventional dampers, is provided with three pairs of prongs 5a by means of which the damper in its operative position is mounted on bridge 2 intermediate of the strings 3. The body of damper 5 comprises a groove 5b of rectangular cross-section, by means of which the damper is detachably mounted on the free end 6a of an arm 6. The other end of the latter comprises a smooth cross-bore 6b (Fig. 3) in which is mounted the central portion of a pivot pin 7 so that the latter is rotatable while overcoming a certain amount of friction. The two end portions of pin 7 projecting from bore 6b are engaged in bores 8a of a clamping element 8 which comprises a pair of clamping jaws 8b between which is situated a slot 8c. The clamping elements 8 suitably are stuck to the ends of pin 7, care being taken to arrange both of the slots 8c in one and the same plane.

When mounting the damping attachment on the instrument, the rear portion of the attachment first is held between those portions of two intermediate strings 3 which extend rearwardly from bridge 2, so that pin 7 extends in parallel relation with the strings and in the center thereof. The rear portion of the attachment then is turned through 90° in the plane of said two string portions. The latter then abut against the bottom of the slots 8c of the two clamping elements 8 which thus are frictionally retained by the strings in the slots 8c. Any unintentional displacement thus is not to be feared, but an intentional displacement after applying the attachment, for the purpose of adjusting the same with respect to bridge 2, is readily possible. Once the attachment has been properly adjusted, the damper 5 may be brought into or out of its operative position by swinging the arm 6 and damper 5 downwardly and upwardly respectively, as shown in Figs. 1 and 2, and the damping attachment as a whole does not have to be removed from the string instrument. When swinging the arm 6 downwardly, the projecting foremost end of arm 6 may be slightly engaged by one of the player's fingertips.

Fig. 4 shows a modification of the rear portion of the attachment shown in Fig. 3. In this modification, a slightly wider bore is provided in the rear-end portion of arm 6' in which bore is rotatably mounted a somewhat thicker pivot pin 9 which is axially held, in known manner, by means of a pin 20 which is engaged in an annular groove 9a of pivot pin 9. The two end portions of the latter are provided with a slot 9c to form two pairs of clamping jaws 9b of which the walls are frictionally engaged by the strings 3.

The second form of invention shown in Fig. 5 principally does not differ from the first form. The damper 10 comprises a single pair of prongs 10a and is secured to the free end of a leaf spring 11 which forms the front portion of an arm corresponding to arm 6 of the first form. Instead of only one pair of prongs 10a, two or more such pairs could be provided. The rear portion of said arm consists of a bearing member 12 which is rotatable, while overcoming a certain friction, on the bare intermediate portion of a screw. The slotted head 13 of the latter rests in one of two bearing bosses 14a, 14b which are fixed to a base plate 14. The front end of said screw is engaged in a threaded bore provided in the other of these two bosses. The base plate 14 is arched in its longitudinal direction slightly more than the top edge of bridge 2 and comprises a slight kink 14c immediately outside of the two bosses 14a, 14b. Said plate 14 forms the rear portion of the damping attachment and is applied to the string instrument by first moving one end thereof underneath one of the two exterior strings of the four strings 3, then laying the central plate portion on the two intermediate strings, and finally by slipping the other end underneath the other exterior side, whereupon the plate is swung into position. In this form also, the damper 10 may be moved into or out of its operative position by merely swinging the arm 11, 12 downwardly or upwardly respectively, without removing the damping attachment as a whole from the string instrument.

The parts 5, 6 and 8 of the first form, and the parts 10, 12 and 14 of the second form suitably are made of a convenient plastic. The pivot pins 7 and 9 may be made of steel or another metal or of plastic. The spring 11 is molded into the parts 10, 12. The parts 11, 12 or 10 to 12 could be made integral and of plastic. The same holds true for the parts 5 and 6, when foregoing the exchangeability of damper 5. In the second form, vice versa, the damper could be exchangeably mounted on the arm.

Finally, it may be mentioned that in none of the various forms of invention described and shown, the mounting of the rear portion of the damping attachment on two and four strings respectively, has any detrimental effect on the sound quality of the instrument.

We claim:

1. A damping attachment for stringed musical instruments, which includes a bridge having strings spanned thereover and attached to a string retainer, said attachment comprising an arm adapted to extend parallel to the strings between the bridge and the retainer, said arm having an end portion formed with a transverse opening, a member disposed in the opening and about which the arm is rotatable, said member having opposing ends projecting laterally from the arm in opposite directions, means on each end of the member for transversely engaging the strings to attach the arm thereto between the bridge and the retainer, and a damper carried by the other end of the arm and adapted to be detachably fitted on the bridge, said damper being movable upon the swinging of the arm about said member from a position on the bridge to a position overlying the retainer.

2. A damping attachment as claimed in claim 1, wherein said arm and damper are formed from plastic.

3. A damping attachment as claimed in claim 1, wherein said arm and damper are integrally formed from plastic.

4. A damping attachment for stringed musical instruments having strings spanned over a bridge, comprising an arm adapted to be disposed parallel to the strings and having an end portion formed with a transverse opening, a cylindrical member disposed in said opening and about which the arm is rotatable, said member having opposing ends projecting laterally from the arm in opposite directions, means provided on the ends for transversely receiving a string, and a damper carried by the other end of the arm and adapted to be detachably fitted over a bridge.

5. A damping attachment as claimed in claim 4, wherein said member has means axially locating it in the opening and said means on its ends includes a slot formed diametrically in the end wall and frictionally receiving a string.

6. A damping attachment as claimed in claim 4, wherein said member includes a pin and said means on the ends thereof includes clamping elements having clamping jaws adapted to receive a string therebetween.

7. A damping attachment as claimed in claim 4, wherein said arm and damper are integral and are formed from plastic.

8. A damping attachment as claimed in claim 4, wherein said member is adapted to be disposed transversely between a pair of strings and said means on its ends includes integral clamping jaws adapted to frictionally clamp on a string.

References Cited in the file of this patent
UNITED STATES PATENTS
516,093   Hoeft _____ Mar. 6, 1894